United States Patent [19]

Archer

[11] 4,340,469
[45] Jul. 20, 1982

[54] VIBRATORY SCREEN APPARATUS

[75] Inventor: Fred C. Archer, Spokane, Wash.

[73] Assignee: Spokane Crusher Mfg. Co., Spokane, Wash.

[21] Appl. No.: 227,759

[22] Filed: Jan. 23, 1981

[51] Int. Cl.³ .............................................. B07B 1/28
[52] U.S. Cl. ................................. 209/315; 209/363; 209/367; 74/87; 248/544
[58] Field of Search .................. 209/326, 325, 366.5, 209/315, 367, 363, 364; 74/61, 87; 198/770; 248/594, 559, 665

[56] References Cited

U.S. PATENT DOCUMENTS

| | | | |
|---|---|---|---|
| 1,169,133 | 1/1916 | Weist | 248/665 X |
| 1,894,904 | 1/1933 | De Rebot | 248/544 X |
| 2,144,382 | 1/1939 | Lincoln | 209/326 X |
| 2,200,724 | 5/1940 | Robins | 74/87 |
| 2,204,379 | 6/1940 | Overstrom | 209/320 |
| 2,294,448 | 9/1942 | Coyle | 209/367 |
| 2,358,449 | 9/1944 | Finney | 209/326 X |
| 2,774,244 | 12/1956 | Bergstrom | 74/61 |
| 2,902,868 | 9/1959 | Ferrara | 74/61 X |
| 3,053,379 | 9/1962 | Roder | 198/770 |
| 3,204,782 | 12/1972 | Hahn | 209/326 |
| 3,226,989 | 1/1960 | Robins | 74/87 |
| 3,337,165 | 8/1967 | Kondo | 248/539 X |
| 3,483,972 | 12/1969 | Elliott | 209/326 X |
| 3,491,881 | 1/1970 | Winquist | 209/326 |
| 3,630,357 | 12/1971 | Nolte | 209/367 |
| 3,776,352 | 12/1973 | Musschost | 198/720 |
| 4,078,996 | 3/1978 | Cohen-Alloro | 209/441 |

FOREIGN PATENT DOCUMENTS

| | | | |
|---|---|---|---|
| 896445 | 10/1953 | Fed. Rep. of Germany | 209/366.5 |
| 1048912 | 8/1953 | France | 198/770 |
| 525253 | 8/1940 | United Kingdom | 209/366.5 |
| 1026358 | 4/1966 | United Kingdom | 248/559 |
| 663447 | 12/1976 | U.S.S.R. | 209/366.5 |

Primary Examiner—Robert Halper
Attorney, Agent, or Firm—Wells, St. John & Roberts

[57] ABSTRACT

A vibratory screen apparatus is described for classifying loose solid material through horizontal screens 22–24 that are vibrated in elliptical paths by two independent eccentric weight means 28 and 30. The eccentric weight means 28 and 30 are mounted on the screen frame 15 elevationally below the center of gravity of the apparatus and upstream of the center of gravity toward the feed end. Each of the eccentric weight means include adjustable weights for adjusting the "throw" of the classifier that are outboard of bearings that support shafts that extend between the sides of the frame.

18 Claims, 8 Drawing Figures

VIBRATORY SCREEN APPARATUS

BACKGROUND OF THE INVENTION

This invention relates to vibratory screen apparatus for classifying loose solid material utilizing unbalanced weights to generate gyrational vibratory motion in the apparatus.

One of the principal objects of this invention is to provide a vibratory screen apparatus that is very compact and efficient for vibrating solid loose material to classify the material utilizing vertically spaced screens in which the screens are mounted in a substantially horizontal orientation.

A further object of this invention is to provide a vibratory screen apparatus that is capable of efficiently classifying material in a dynamic environment of continuous feed at one end and discharge of material from an opposite end.

A further object of this invention is to provide an improved vibratory screen apparatus that is capable of vibrating the screens in elliptical paths in which the magnitude of the vibration progressively decreases from the feed end to the discharge end as the material is being classified by the vibrating screens.

A still further object of this invention is to provide a vibratory screen means with a very efficient mechanism for adjusting the vibratory throw of the screens.

A further object of this invention is to provide improved vibratory screen apparatus that has a mechanism for maintaining belt tension between the unbalanced shafts for generating the vibration and drive motors that are mounted on stationary platforms.

These and other objects and advantages of this invention will become apparent upon reading the following detailed description of the preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
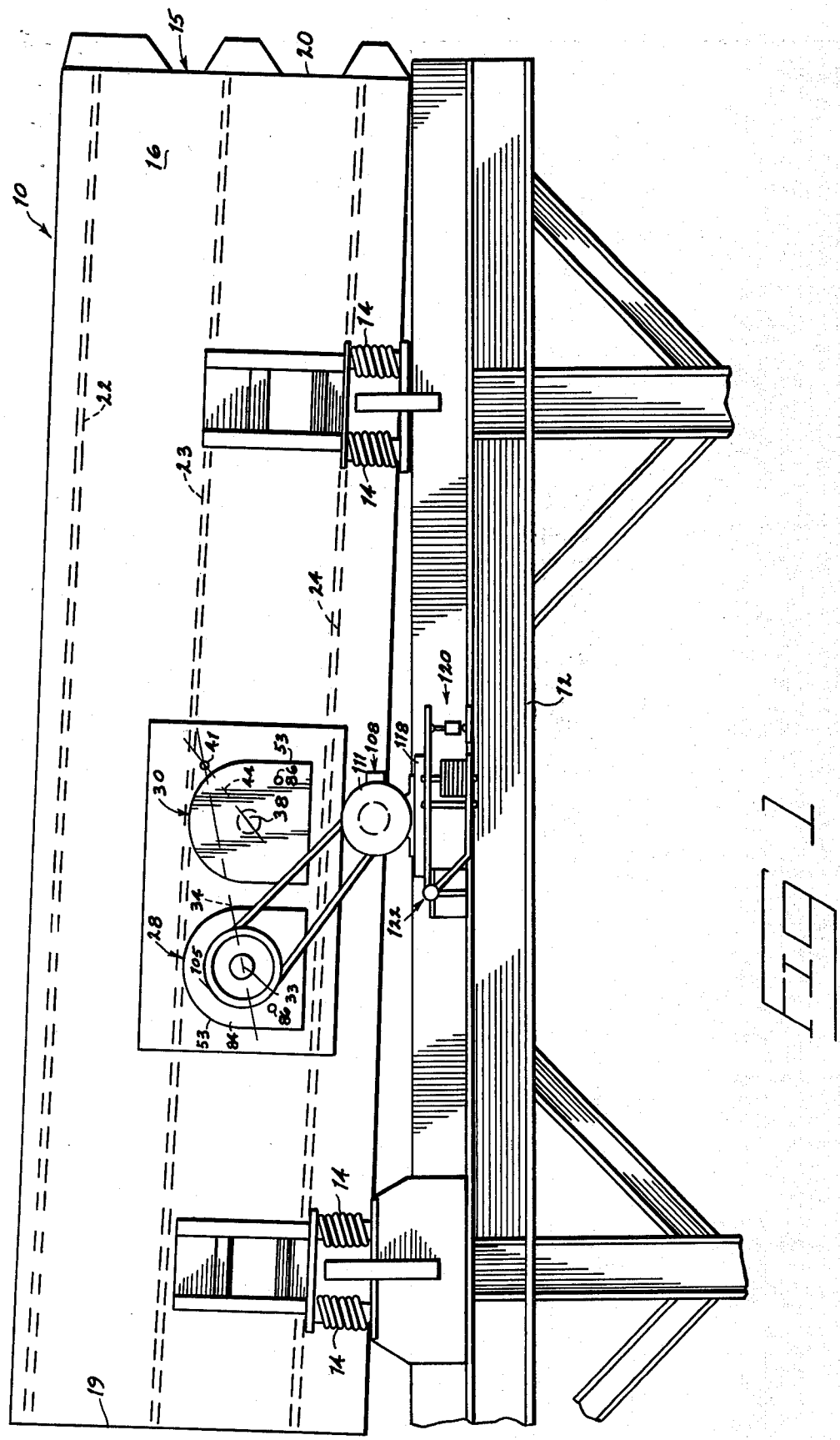
FIG. 1 is a side elevation view of a vibratory screen apparatus mounted on a base illustrating the location of two independent eccentric weight vibrators, in which screens are illustrated in dotted lines.

Referring now to the drawings, there is illustrated in FIG. 1 a vibratory screen apparatus generally designated with the numeral 10 for classifying loose solid material such as aggregate, sand or gravel into desired sizes as the material is processed by the apparatus.

The apparatus 10 is mounted in a substantially horizontal orientation and may be referred to as a "horizontal type" vibratory screen apparatus. The apparatus 10 is mounted on a stationary base 12 at an angle of less than 10°. The apparatus 10 is resiliently mounted on the base so that the apparatus may be readily vibrated to classify the material. As illustrated in FIG. 1, the apparatus 10 is mounted to the base 12 on coil springs 14. Various types of spring mechanisms or resilient mounts may be utilized to accomplish a resilient mounting of the apparatus on the base 12.

The apparatus 10 includes an elongated screen frame 15 having elongated side walls 16 and 17 that are substantially parallel with each other and extend from a feed end 19 to a discharge end 20. In a preferred embodiment the elongated screen frame 15 includes a plurality of screens 22, 23 and 24 that are vertically spaced with respect to each other with screen 22 referred to as the uppermost screen and the screen 24 referred to as the lowermost screen. The size of the apparatus in the screens progressively decreases from the upper screen 22 to the lower screen 24. As previously mentioned the screens 22–24 are generally horizontally oriented at an inclination of less than 10° so that the material does not move across the screen from the feed end to the discharge end by its natural angle of repose. Vibration is required to cause the material to migrate from the feed end 19 to the discharge end 20 and to cause the material to become sufficiently agitated to permit smaller material to flow downward through the screens without the apertures in the screens becoming clogged by the larger material.

The apparatus 10 includes two unbalanced weight vibrator means 28 and 30 that are independently operated (uncoupled) and are not directly connected to each other even though it is intended that they operate in a self-synchronizing manner with respect to the center of gravity of the apparatus.

Figure 8:
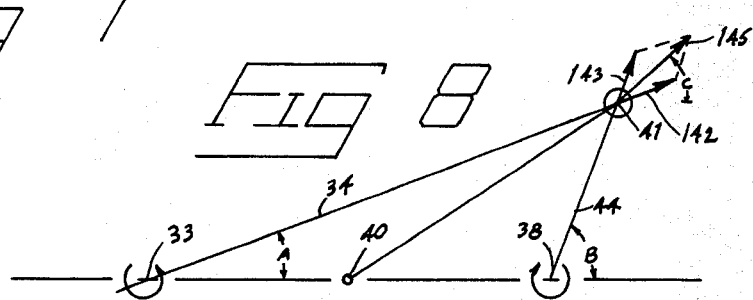
FIG. 8 is a schematic view of the relationship of the rotational axis of the eccentric weight vibrator with respect to the center of gravity of the apparatus illustrating the "vibrational throw".

Each of the unbalanced weight vibratory means 28, 30 include an elongated shaft 32 (FIGS. 2 and 4) that is slightly eccentric and extends horizontally between the side walls 16 and 17 vertically displaced between the uppermost screen 22 and the lowermost screen 24. In a preferred embodiment the shafts extend between the side walls between the intermediate screen 23 and the lowermost screen 24. Each of the shafts 32 of the unbalanced weight vibratory means 28, 30 rotate about spaced axes identified with numerals 33 and 38 respectively (FIGS. 1 and 8). Each of the shafts 32 are mounted for rotation in bearing 35 that is affixed to the exterior of the side walls 16 and 17.

A midpoint 40 (FIG. 8) is defined as a point that is equal distance between the shaft axis 33 and 38. The apparatus 10 includes a center of gravity 41 that is illustrated in FIGS. 1 and 8. An important feature of this invention is that the shaft axes 33 and 38 are positioned vertically below the center of gravity 41 and that the midpoint 40 is located upstream of the center of gravity 41 or between the center of gravity 41 and the feed end 19.

A line between the center of gravity 41 and the shaft axis 33 is referred to by the numeral 34 and the line between the center of gravity 41 and the shaft axis 38 is identified with the numeral 44. In a preferred arrangement the vibratory means 28 and 30 are oriented so that the angle A (FIG. 8) of line 43 plus the angle B of line 44 equals twice the desired throw angle C of the apparatus as calculated at the center of gravity. In a preferred embodiment it is desired that the throw angle C of the apparatus at the center of gravity 41 is between 38° and 52° with respect to horizontal. Consequently, the vibratory means 28 and 30 are oriented so that angle A plus angle B equals twice the desired throw angle C. Angles A, B and C are referenced with respect to lines parallel with the screens.

An additional feature is that the vibratory means 28 and 30 may have unequal weights so that centrifugal forces generated by the vibratory means 28 and 30 are consequently unequal. In a prefered embodiment, it is desirable that the vibratory means that is closest to the center of gravity have the larger centrifugal force magnitude. Such an arrangement causes the vibratory screen apparatus 10 to vibrate in an elliptical path in which the major axis of the elliptical path is inclined toward the discharge end of the apparatus and that the magnitude of the major axis of the elliptical path progressively decreases from the feed end 19 to the discharge end 20. In such an arrangement the maximum throw of the apparatus occurs at the feed end and the minimum throw of the apparatus occurs at the discharge end.

Figure 4:
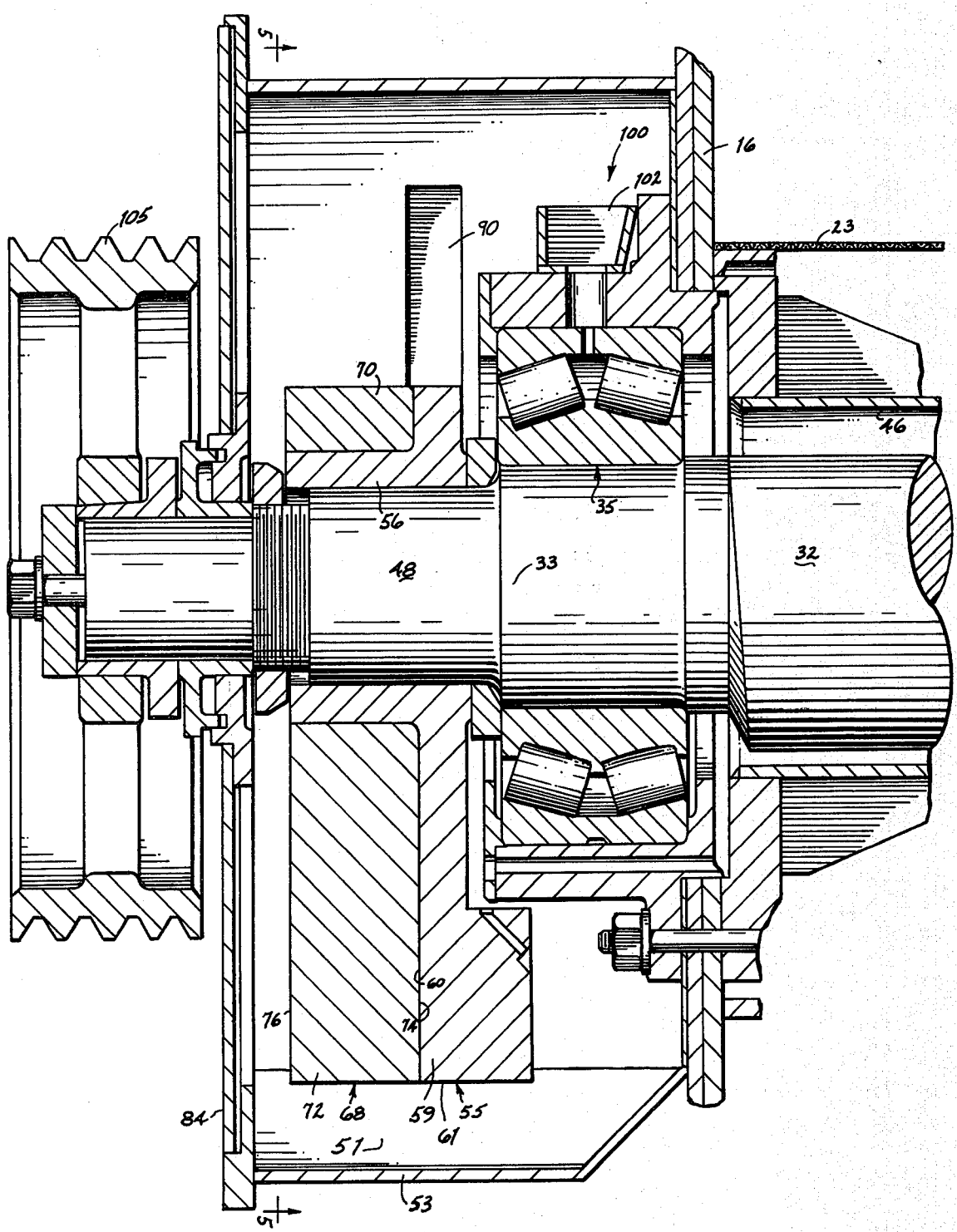
FIG. 4 is a fragmentary cross-sectional view taken along line 4—4 in FIG. 2 illustrating further details of a vibrator mounted on the apparatus.

As illustrated in FIG. 4, each of the shafts 32 rotate within a respective shaft tube 46 that extends between the side walls 16 and 17 for protecting the shaft 32 from the solid material that descends from one screen to another. Each shaft 32 extends through the side walls terminating in shaft ends 48.

Each vibrator means 28, 30 includes eccentric weight means 51 (FIGS. 4-6) that are mounted at opposite ends 48 of the shaft 32 outboard of the bearings 35 for generating gyrational centrifugal forces as the shaft 32 is rotated. Each of the eccentric weight means 51 is positioned in an enclosed housing 53 mounted on the side walls 16 and 17. The enclosed housings 53 are liquid tight and contain oil that is utilized for lubricating the bearings 35.

Each eccentric weight means 51 includes a first weight portion 55 that is affixed on the shaft end 48 for rotation therewith. The first weight portion 55 includes the collar section 56 that slides over the shaft end 48 and is keyed to the shaft. The first weight portion 55 has a semicircular radial weight section 59 that extends radially outward from the collar section 56. The semicircular radial weight section 59 includes a front face 60 with a semicircular periphery 61. The semicircular weight section 59 includes a series of angularly spaced axially extending apertures 64 (FIGS. 5 and 6) that are formed therein adjacent to the periphery. Additionally, the section 59 includes a series of angularly spaced radial rod apertures 66 that extend radially inward from the periphery 61 at angularly spaced locations corresponding with the spacing between the axial apertures 64.

Each eccentric weight means 51 further includes a second weight portion 68 that is rotatably mounted on the collar section 56. The second weight section 68 includes a ring section 70 that fits over the collar 56 and a semicircular weight section 72 that has a similar profile to weight section 59. The semicircular weight section 72 includes a back face 74 that bears against front face 60. The semicircular weight section 72 includes a semicircular front face 76. A matching axial locking aperture 78 is formed in the semicircular weight section 72 to be aligned with one of the apertures 64 to enable the two sections 59 and 72 to be secured together.

Each of the eccentric weight means 51 includes a locking means 80 for projecting through the matching axial locking aperture 78 and one of the series of axial apertures 64 to releasably secure the two weight portions 55 and 68 together at one of the desired angularly spaced relationships. In the preferred embodiment, the locking means 80 includes a bolt that extends through the aperture 78 into one of the apertures 64 to lock the two portions 55 and 68 together.

The enclosed housing 53 includes a front cover 84 that may be opened to permit access to the eccentric weight means 51 and bearings 35. The housing cover 84 includes an access hole 86 (FIG. 1) that is formed therein that has a plug to enclose the access hole 86. The access hole 86 is elevated above the lubrication oil level in the enclosed housing 53 and is aligned to provide direct access to the locking means 80.

Figure 5:
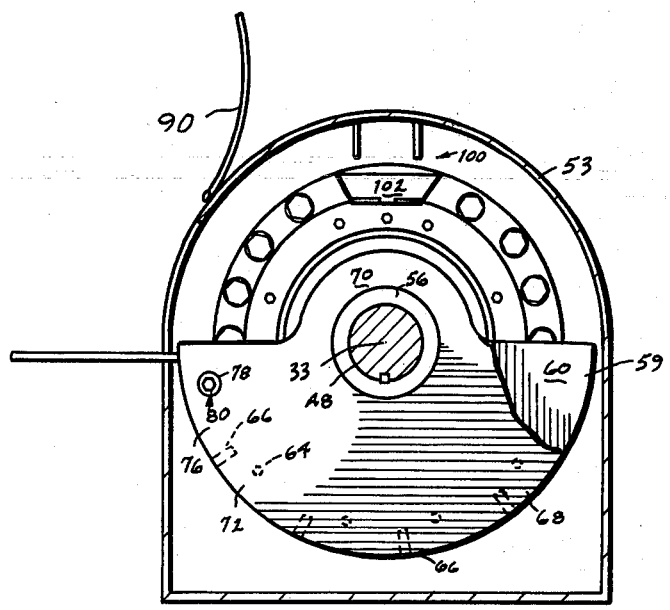
FIG. 5 is a fragmentary cross-sectional view taken along line 5—5 in FIG. 4 showing a front view of the eccentric weights and a means for adjusting relative positions of weight portions to adjust the centrifugal force generated by the vibrator.
Figure 6:
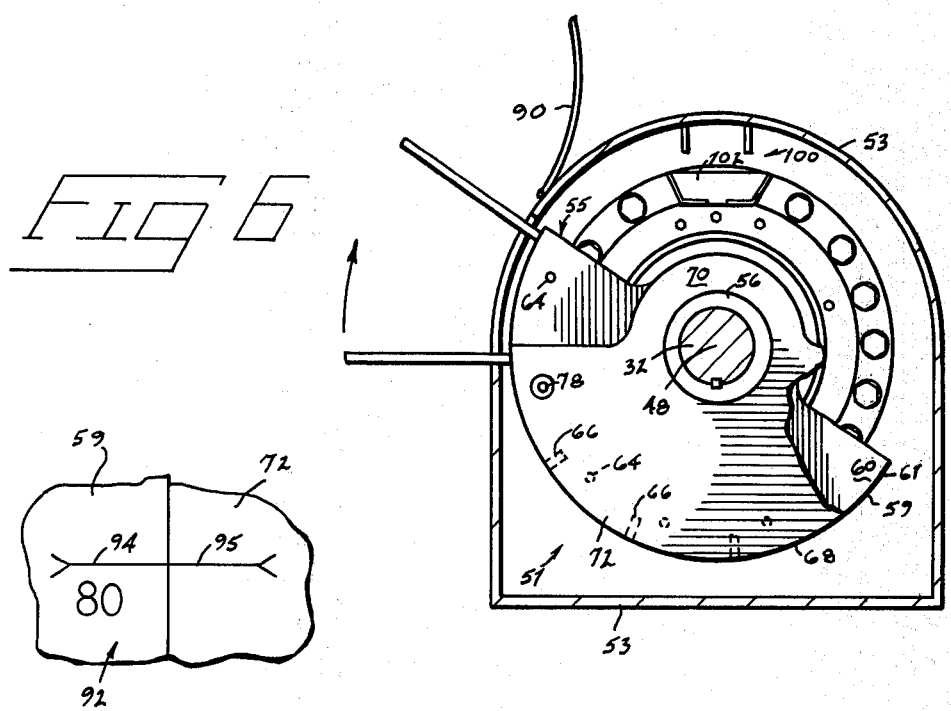
FIG. 6 is similar to FIG. 5 except showing one of the eccentric weight portions moved angularly with respect to the other weight portion to adjust the throw of the vibrator.
Figure 7:
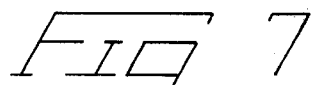
FIG. 7 is an enlarged fragmentary view of the periphery of the weight portions illustrating visual marks formed on the periphery to enable the weights to be adjusted and locked at desired angular positions.

Additionally the enclosed housing 53 includes a side hatch 90 illustrated in FIGS. 5 and 6 for enabling an operator to adjust the angular position of the first and second weight portions 55 and 68. When it is desired to adjust the throw or eccentric forces of either vibrator means 28, 30, the operator merely removes the plug 88 and removes the bolt to permit the first and second weight portions 55 and 68 to be moved angularly with respect to each other. To make an adjustment, the operator inserts a rod or like item into one of the radial rod apertures 66 as illustrated in FIG. 5 and then moves the semicircular weight section 59 upward as illustrated in FIG. 6 to angularly adjust the first weight portion 55 with respect to the second weight portion 68. Such adjustment changes the center of gravity of the vibrator means to adjust the "throw". To assist the operator in aligning the apertures 66 and 64, a visual alignment means 92 illustrated in FIG. 7 is provided on the peripheries of the semicircular weight sections 59 and 72. Specifically, alignment marks 94, 95 are mounted on the peripheries of the semicircular sections 59 and 72 respectively to enable the operator to align the marks 94, 95 with each other so that the operator can determine when the aperture 66 is aligned with a corresponding aperture 64. At this point, the bolt is reinserted into the apertures 64, 66 to lock the portions 55 and 68 together. As illustrated in FIGS. 5 and 6 adjusting rods are utilized for moving the weight portions 55 and 68 relative to each other. In some embodiments, each weight means 51 is extremely heavy exceeding two hundred pounds and is very difficult to manipulate by a single operator without the mechanical advantages provided by the rods. The rods do not encompass a part of the apparatus, but are utilized in adjusting the weight distribution.

The apparatus includes an oil distribution system 100 that utilizes the vibrating means 28 and 30 for distributing the oil through the bearings 35. Specifically, the semicircular weight sections 59 and 72 pass through the oil in the bottom of the housing 53 and cause the oil to be carried upward to the upper portion of the housing. The oil distribution system 100 includes a cup 102 formed above the bearings 35 to cause the oil to flow downward into the bearings to keep them lubricated. The eccentric weight means 51 serve as a portion of the oil distribution system in causing the oil to be carried upward into the cup 102 where the oil is able to drain down into the bearings.

Each of the shafts 32 have a belt sheave 105 mounted on one shaft end 48. The shaft end 48 extends through the housing cover 84 to receive the belt sheave 105.

Figure 2:
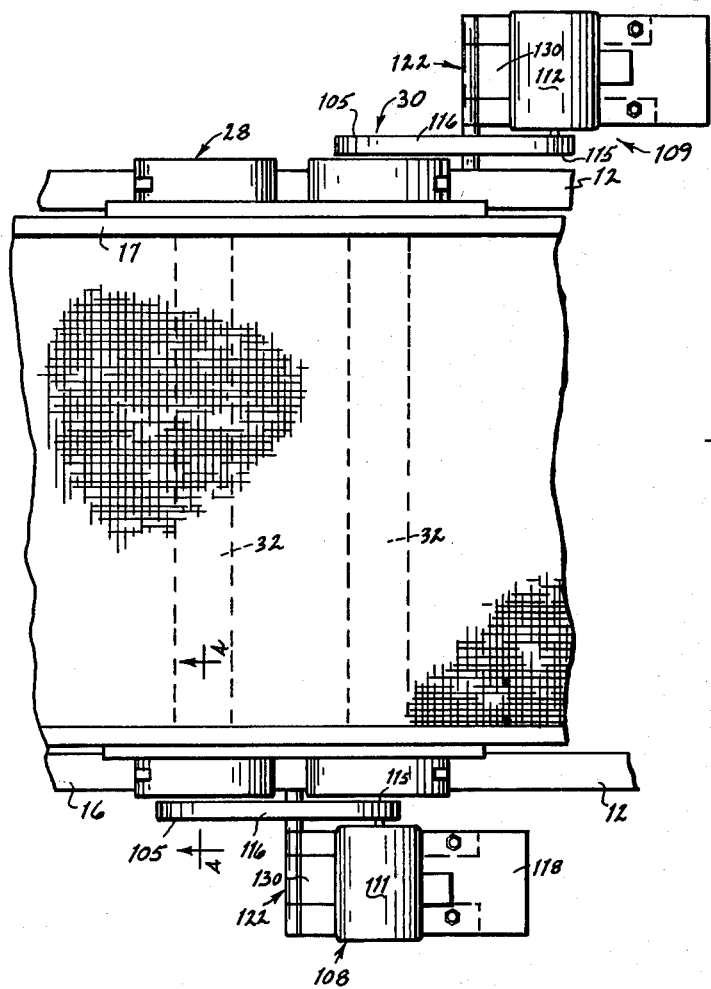
FIG. 2 is a fragmentary top view of the vibratory screen apparatus illustrated in FIG. 1 showing separate drive motors on opposite sides of the apparatus for independently driving eccentric weight vibrators.

As previously mentioned, each of the vibrator means 28, 30 are independently driven. Vibrator means 28 is driven by individual drive means 108 and the vibrator means 30 is driven by individual drive means 109 (FIG. 4). The drive means 108 and 109 comprise motors 111 and 112 respectively that are supported on the base 12 for individually driving the shafts of the vibrating means 28 and 30 through the drive sheave 105. The motors 111 and 112 are mounted on opposite sides of the apparatus as indicated in FIG. 2. Each of the motors 111 and 112 include a shaft 114 that has a belt sheave 115 operably mounted thereon with a belt 116 extending from the drive belt sheave 115 to the driven belt sheave 105 mounted on the shaft 32. The belt 115 extends in a substantially transverse direction to the major axis of the elliptical vibratory path of the apparatus.

Figure 3:
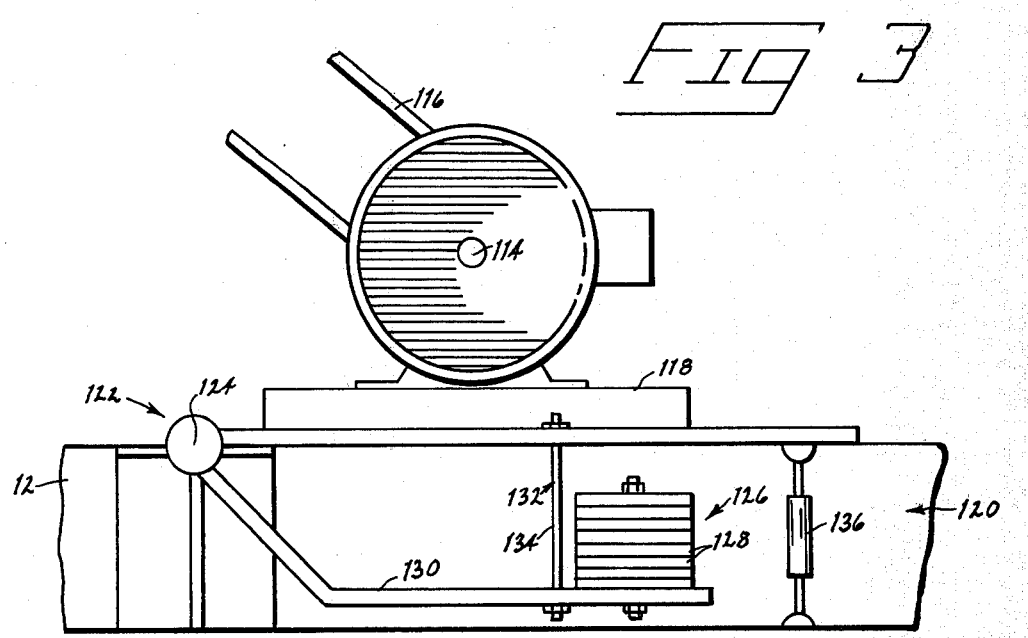
FIG. 3 is an enlarged side view of the drive motor and mechanism for mounting the drive motor to a base.

Each of the motors 111 and 112 has a motor mount 118 (FIGS. 1, 2 and 3) that is pivotally mounted on the base 12. Each of the drives 108 and 109 includes a belt tensioning means 120 that includes a pivotal support means 122 for pivotally supporting the motor mount 118 to enable the motor to pivot about a support shaft axis 124 (FIG. 3). The motors 111 and 112 are mounted for free rotational movement with respect to the shaft axes 124.

Each of the drive means 108 and 109 includes a weight isolation means 126 for dampening and preventing motor bounce as the apparatus is operated with respect to the base 12. The vibration of the motors 111 and 112 is minimized by the belts 116 extending transverse to the major axis of the elliptical path. However, the minor axis of the elliptical path causes the motors to pivot about the shaft axes 124. The weight isolation means 126 minimizes abrupt changes in the movement of the motor and minimizes acceleration and deaccelerational forces from loosening the tension on the belt 116.

The weight isolation means 126 includes weights 128 (FIG. 3) that are mounted on a weight bracket 130 that pivot about the shaft axis 124. The weight bracket 130 prevents the weights 128 from moving laterally but permits the weights to move vertically with respect to the motor mount 118. The weights 128 are suspended by suspension 132 from the motor mount 118 so that a downward force of gravity of the weights increases the tension on the belt. However, the suspension means 132 is constructed so that the weight of the weights 128 do not cause an upward force on the motors 111 and 112 when the motor is moved downward. The motor mount 118 and the weight brackets 130 are interconnected by a rod 134 that prevents the distance between the weights and the motor mount from exceeding a certain value but permit the weights to move upward in relationship to the motor to prevent any rigid connection with the motor mount 118 during the upward movement of the weights. Alternatively, a flexible cable may be interconnected between the motor mount 118 and the weight bracket 130 to prevent upward forces from being exerted on the motor which might cause motor bounce or compound the upward and downward movement of the motor with respect to the shaft axis 124.

The number of weights 128 may be adjusted as necessary to maintain the belt tensions substantially uniform even though the apparatus is vibrating. Additionally, the apparatus 10 includes an acceleration dampening device 136 for minimizing rapid acceleration of the motors 111, 112 in either of the upward or downward directions in response to the movement of the screen frame 15. The suspension 132 may be considered to be a rigid connection with respect to the downward movement of the weights but as a flexible connection when the weights are moved upward so that the weights 128 do not add to the mass of the motor as the motor pivots upward about the shaft 124.

FIG. 8 illustrates in a schematic form the location of the vibratory means 28, 30 with respect to the center of gravity 41. The vibrator means 28 generates a force through the center of gravity 41 along line 34 of a magnitude indicated by the force line 142. The vibrator means 30 generates a force through the center of gravity having a magnitude represented by the force arrow 143. The resultant force line is illustrated by the arrow 145. The resultant force line 145 represents one half of the major axis of the elliptical movement of the apparatus with respect to the center of gravity. As previously, mentioned, angles A plus B equal twice the angle of C. The force arrow 145 represents one half of the throw of the apparatus at the center of gravity.

As previously mentioned, the magnitude of the throw progressively decreases from the infeed end 19 to the discharge end 20 because of the moment created by the offset vibratory means 28 and 30 in the direction of the feed end 19. In many applications, it is desirable to have angle C of the throw at the center of gravity between 38° and 42° with an optimum angle C being at 45° with respect to the horizontal. After the designer selects the desired throw angle C, then he is able to select angles A and B to obtain the desired vibratory motion of the apparatus.

It should be understood that the above described embodiment is simply illustrative of the principles of this invention and numerous other embodiments may be readily devised without deviating therefrom. Therefore, only the following claims are intended to define this invention.

What is claimed is:

1. A self-synchronizing multi-vibratory screen apparatus for classifying loose solid material, comprising:

a screen frame resiliently mounted on a base in which the screen frame supports a plurality of vertically spaced substantially horizontal classifying screens extending between side walls from a feed end to a discharge end with the screens defining an uppermost screen and lowermost screen;

a first unbalanced weight vibrator means mounted on the frame with a first shaft extending horizontally between the side walls interconnecting eccentric weights with the shaft journalled to rotate about a first vibratory axis vertically spaced intermediate the uppermost and lowermost screens to generate a first gyrational centrifugal force of a desired first magnitude about the first vibratory axis when the shaft is rotated at a desired speed;

a second unbalanced weight vibratory means mounted on the frame with a shaft extending horizontally between the side walls interconnecting vibratory axis vertically spaced intermediate the uppermost and lowermost screens and parallel with the first vibratory axis to generate a second gyrational centrifugal force of a desired second magnitude about the second vibratory axis when the second shaft is rotated at the desired speed;

individual motor drive means for independently rotating the corresponding shafts in self synchronization at the desired speed cause the screens to vibrate in elliptical paths with the maximum amplitudes of the elliptical paths inclined toward the discharge end to agitate the loose solid material on the horizontal screens and and to cause the material on the horizontal screens to migrate from the feed end towards the discharged end;

wherein the apparatus has a center of gravity;

wherein the first and second vibratory axes are spaced vertically below the center of gravity and wherein a midpoint between the first and second vibratory axes is horizontally spaced from the center of gravity toward the infeed end of the frame to generate a rocking moment about the center of gravity to cause the maximum amplitude of the elliptical paths of the screen to progressively decrease from the infeed end to the discharged end.

2. THe vibratory screen apparatus as defined in claim 1 wherein the angle of the maximum amplitude of the elliptical vibratory path of the apparatus at the center of gravity is at an inclined acute angle to the horizontal that is substantially equal to one half of the sum of the first horizontal angle of the first axis with respect to a line extending from the first axis through the center of gravity and a second horizontal angle of the second axis with respect to a line extending from the second axis through the center of gravity.

3. The vibratory screen apparatus as defined in claim 1 wherein both vibratory axes are located between the center of gravity of the apparatus and the infeed end of the frame.

4. The vibratory screen apparatus as defined by claim 1 wherein the vibratory axes are unequally spaced from the center of gravity and wherein the magnitude of the centrifugal force of the vibratory means closest to the center of gravity of the apparatus is greater than the magnitude of the centrifugal force of the vibratory means furthest from the center of gravity of the apparatus.

5. The vibratory screen apparatus as defined in claim 1 wherein the shafts are journalled in bearings affixed to the side walls and wherein the shafts extend outward from the side walls and wherein eccentric weights are mounted on the shafts adjacent shaft ends outboard of the bearings.

6. The vibratory screen apparatus is defined in claim 4 wherein each of the eccentric weights has a first portion that is angularly affixed to the respective horizontal shaft and a second portion that is angularly adjustable in a vertical plane about the horizontal shaft axis with respect to the first weight portion to enable the magnitude of the centrifugal force produced by the respective vibratory means to be adjustable.

7. The vibratory screen apparatus as defined in claim 6 wherein each of the eccentric weights has adjustment means along its periphery for adjusting the angular position of the first portion relative to the second portion about the horizontal shaft axis.

8. The vibratory screen apparatus as defined in claim 6 wherein each of the eccentric weights is mounted in a liquid tight housing outboard of a shaft bearing and wherein housing includes a vertically elongated side hatch to provide access to the periphery of one of the weight portions and where the one weight portion has a series of radial apertures formed in its periphery in alignment with the vertically elongated side hatch to enable an adjusting rod to be inserted through the side hatch and into an aperture to enable the one weight portion to be moved angularly in the vertical plane about the horizontal shaft axis with respect to the other weight portion to adjust the magnitude of the centrifugal force generated by the respective vibratory means.

9. The vibratory screen apparatus as defined in claim 8 wherein the one weight portion has a series of axial locking apertures formed therein at angularly spaced locations about the shaft axis and wherein the other weight portion has a matching axial locking aperture and wherein the peripheries of the weight portions have alignment marks formed thereon that may be viewed through the side hatch that correspond to the location of the matching axial locking aperture and the series of axial locking apertures to visually display when the matching axial locking aperture is in alignment with one of the series of axial locking apertures and wherein the vibratory means includes a locking means for projecting through the aligned apertures to releasably secure the weight portions together.

10. The vibratory screen apparatus as defined in claim 1 wherein the apparatus includes an acceleration dampening device interconnecting the motor and the screen frame to dampen the accelerational forces between the frame and the motor.

11. A vibratory screen apparatus for classifying loose solid material, comprising:

a screen frame resiliently mounted on a base having a classifying screen extending between side walls from a feed end to a discharge end;

an unbalanced weight vibratory means mounted on the frame with a shaft extending horizontally between the side walls with the shaft journalled in bearings affixed to the side walls for enabling the shaft to rotate about a shaft axis that is spaced from a center of gravity of the frame and vibratory means to apply vibratory movement to the screen frame;

a driven belt sheave mounted on one side of the shaft;

a drive motor having a drive shaft with a drive belt sheave operatively mounted thereon;

drive belt means interconnecting the drive belt sheave and the driven belt sheave to cause the frame to vibrate at a frequency related to the speed of the motor;

support means for pivotally mounting the motor to the base to enable the motor to freely pivot about a pivot axis spaced from the motor shaft in response to the vibratory movements;

belt tensioning means comprised of one or more weights operatively connected to the motor for applying a downward force on the motor to increase the static tension of the drive belt means between the sheaves;

weight isolation means operatively interconnecting the motor and belt tensioning weight to prevent the weight from exerting an upward force on the motor as the vibratory means vibrates to minimize motor bounce and to maintain a more uniform belt means tension between the sheaves.

12. The vibratory screen apparatus as defined in claim 11 wherein the weights are supported on a bracket that enables the weights to move vertically but restricts horizontal movement of the weights and wherein the weight isolation means includes a connection means between the belt tensioning means and the motor that applies the downward force of the weights when vertical acceleration forces attempt to move the motor and weights away from each other and that relieves the downward force of the weights when vertical acceleration forces attempt to move the motor and weight toward each other.

13. A self-synchronizing multi-vibratory screen apparatus for classifying loose solid material, comprising:

a screen frame resiliently mounted on a base in which the screen frame supports a plurality of vertically spaced substantially horizontal classifying screens extending between side walls from a feed end to a discharge end with the screens defining an uppermost screen and lowermost screen;

a first unbalanced weight vibrator means mounted on the frame with a first shaft extending horizontally between the side walls interconnecting eccentric weights with the shaft journalled to rotate about a first vibratory axis vertically spaced intermediate the uppermost and lowermost screens to generate a first gyrational centrifugal force of a desired first magnitude about the first vibratory axis when the shaft is rotated at a desired speed;

a second unbalanced weight vibratory means mounted on the frame with a shaft extending horizontally between the side walls interconnecting vibratory axis vertically spaced intermediate the uppermost and lowermost screens and parallel with the first vibratory axis to generate a second gyrational centrifugal force of a desired second magnitude about the second vibratory axis when the second shaft is rotated at the desired speed;

individual motor drive means for independently rotating the the corresponding shafts in self synchronization at the desired speed cause the screens to vibrate in elliptical paths with the maximum amplitudes of the elliptical paths inclined toward the discharge end to agitate the loose solid material on the screens and to cause the material on the screens to migrate towards the discharged end;

wherein the apparatus has a center of gravity;

wherein the first and second vibratory axes are spaced vertically below the center of gravity and wherein a midpoint between the first and second vibratory axes is horizontally spaced from the center of gravity toward the infeed end of the frame to generate a rocking moment about the center of gravity to cause the maximum amplitude of the elliptical paths of the screen to progressively decrease from the infeed end to the discharged end; and wherein the angle of the maximum amplitude of the elliptical vibratory path of the apparatus at the center of gravity is at an inclined acute angle to the horizontal that is substantially equal to one half of the sum of the first horizontal angle of the first axis with respect to a line extending from the first axis through the center of gravity and a second horizontal angle of the second axis with respect to a line extending from the second axis through the center of gravity.

14. The vibratory screen apparatus as defined in claim 13 wherein both vibratory axes are located between the center of gravity of the apparatus and the infeed end of the frame.

15. The vibratory screen apparatus as defined in claim 13 wherein the shafts are journalled in bearings affixed to the side walls and wherein the shafts extend outward from the side walls and wherein the eccentric weights are mounted on the shafts adjacent shaft ends outboard of the bearings.

16. The vibratory screen apparatus as defined by claim 13 wherein the vibratory axes are unequally spaced from the center of gravity and wherein the magnitude of the centrifugal force of the vibratory means closest to the center of gravity of the apparatus is greater than the magnitude of the centrifugal force of the vibratory means furthest from the center of gravity of the apparatus.

17. The vibratory screen apparatus as defined in claim 13 wherein the vibratory axes lie in a common plane substantially parallel with the horizontal classifying screens.

18. A vibratory screen apparatus for classifying loose solid material, comprising:

a screen frame resiliently mounted on a base having a classifying screen extending between side walls from a feed end to a discharge end;

an unbalanced weight vibratory means mounted on the frame with a shaft extending horizontally between the side walls with the shaft journalled in bearings affixed to the side walls for enabling the shaft to rotate about a shaft axis with eccentric weights mounted on the shaft to apply vibratory movement to the screen frame;

motor drive means for rotating the shaft with the eccentric weights to vibrate the classifying screen to agitate the loose solid material;

wherein each of the eccentric weights has a first portion that is angularly affixed to the respective shaft and a second portion that is angularly adjustable about the shaft axis with respect to the first weight portion to enable the magnitude of the centrifugal force produced by the respective vibratory means to be adjustable;

wherein each of the eccentric weights is mounted in a liquid tight housing outboard of a shaft bearing and wherein housing includes a vertically elongated side hatch to provide access to the periphery of one of the weight portions and where the one weight portion has a series of radial apertures formed in its periphery in alignment with the vertically elongated side hatch to enable an adjusting rod to be inserted through the side hatch and into an aperture to enable the one weight portion to be moved angularly about the shaft axis with respect to the other weight portion to adjust the magnitude of the centrifugal force generated by the respective vibratory means; and wherein the one weight portion has a series of axial locking apertures formed therein at angularly spaced locations about the shaft axis and wherein the other weight portion has a matching axial locking aperture and wherein the peripheries of the weight portions have alignment marks formed thereon that may be viewed through the side hatch that correspond to the location of the matching axial locking aperture and the series of axial locking apertures to visually display when the matching axial locking aperture is in alignment with one of the series of axial locking apertures and wherein the vibratory means includes a locking means for projecting through the aligned apertures to releasably secure the weight portions together.

* * * * *